US006408526B1

(12) United States Patent
Montesanti et al.

(10) Patent No.: US 6,408,526 B1
(45) Date of Patent: Jun. 25, 2002

(54) ULTRA-PRECISION POSITIONING ASSEMBLY

(75) Inventors: Richard C. Montesanti, San Francisco; Stanley F. Locke, Livermore; Samuel L. Thompson, Pleasanton, all of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/289,761

(22) Filed: Apr. 12, 1999

(51) Int. Cl.$^7$ .............................. B23Q 3/18; B23Q 1/26
(52) U.S. Cl. .............................. 33/1 M; 33/502; 269/60
(58) Field of Search ..................... 33/1 M, 502; 269/60

(56) References Cited

U.S. PATENT DOCUMENTS

| | | | | |
|---|---|---|---|---|
| 3,574,292 A | * | 4/1971 | Butts ............................ | 91/37 |
| 4,449,262 A | * | 5/1984 | Jahsman et al. ............... | 5/601 |
| 4,571,149 A | * | 2/1986 | Soroka et al. ............ | 414/749.1 |
| 4,607,166 A | * | 8/1986 | Tamaki .................. | 250/442.11 |
| 4,685,661 A | | 8/1987 | Slocum et al. ................ | 269/20 |
| 4,929,009 A | * | 5/1990 | Vandersluis et al. ........... | 294/2 |
| 5,022,665 A | * | 6/1991 | Hines et al. ................ | 279/2.14 |
| 5,234,222 A | * | 8/1993 | Hines et al. ................ | 279/2.13 |
| 5,468,216 A | * | 11/1995 | Johnson et al. ............... | 601/24 |
| 5,678,944 A | | 10/1997 | Slocum et al. ................ | 403/13 |
| 5,718,617 A | * | 2/1998 | Priestley et al. .............. | 451/14 |
| 5,747,896 A | * | 5/1998 | Nagai et al. .................. | 310/20 |
| 5,843,496 A | * | 12/1998 | Ito et al. ..................... | 425/589 |

OTHER PUBLICATIONS

Letter to Dr. Richard C. Montesanti from Dan E. Luttrell, 1998 Conference Chairman, dated May 11, 1998.

Diamond Flycutting Machine for Producing Flat Surfaces on Half–Meter Scale Diamond–Turnable Optics, Montesanti et al., LLNL. Montesanti et al., Mar. 13, 1998.

Vertical–Axis Positioning System with 100 mm of Travel and 50 nm Resolution For Ultra–Precision Machining Applications for Half–Meter Scale Objects, Montesanti et al., LLNL. Montesanti et al., Mar. 13, 1998.

* cited by examiner

Primary Examiner—Diego Gutierrez
Assistant Examiner—R Alexander Smith
(74) Attorney, Agent, or Firm—Ann Lee; Alan H. Thompson

(57) ABSTRACT

An apparatus and method is disclosed for ultra-precision positioning. A slide base provides a foundational support. A slide plate moves with respect to the slide base along a first geometric axis. Either a ball-screw or a piezoelectric actuator working separate or in conjunction displaces the slide plate with respect to the slide base along the first geometric axis. A linking device directs a primary force vector into a center-line of the ball-screw. The linking device consists of a first link which directs a first portion of the primary force vector to an apex point, located along the center-line of the ball-screw, and a second link for directing a second portion of the primary force vector to the apex point. A set of rails, oriented substantially parallel to the center-line of the ball-screw, direct movement of the slide plate with respect to the slide base along the first geometric axis and are positioned such that the apex point falls within a geometric plane formed by the rails. The slide base, the slide plate, the ball-screw, and the linking device together form a slide assembly. Multiple slide assemblies can be distributed about a platform. In such a configuration, the platform may be raised and lowered, or tipped and tilted by jointly or independently displacing the slide plates.

17 Claims, 6 Drawing Sheets

ULTRA-PRECISION POSITIONING ASSEMBLY

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates generally to positioning devices, and more particularly to an ultra-precision positioning assembly.

2. Discussion of Background Art

Positioning devices are widely employed for a variety of tasks in many fields. Depending upon the task, positioning devices typically have tolerances from a few millimeters to a few nanometers. Ultra-precision positioning devices, having tolerances in the nanometer range, are used in applications such as machining (single-point, fixed-abrasive, and loose abrasive), positioning (measurement and inspection devices, optical and laser devices, and astronomy), optics manufacturing and testing (glass, ceramic, and metal), and micro-fabrication (large-scale three-dimensional device) applications.

As tolerances become smaller and the mass of an object to be positioned increases, the positioning device's expense tends to exponentially increase. For example, very large Potassium Di-hydrogen Phosphate (KDP) crystal plates (typically sized as 470 mm×560 mm workpieces ranging in thickness from 10 mm to 100 mm) need to be fabricated for the National Ignition Facility (NIF) at Lawrence Livermore National Laboratory. These massive plates must be fabricated on a machine capable of producing a 1.5 micron flat surface, with a depth-of-cut resolution of 50 nm, and able to produce wedge angles in two directions up to plus or minus 0.25 degree. Such a machine would need to possess a difficult-to-achieve combination of long vertical travel, fine positioning resolution, angular tip and tilt capability, and a high degree of mechanical stiffness.

Currently, no such positioning apparatus has been found to exist. Currently available ultra-precision positioning apparatus' are highly complex, costly, and cannot achieve the required performance due to an inability to accommodate the combined requirements for long vertical travel, fine positioning resolution, angular tip and tilt capability, and high mechanical stiffness. In addition, currently available ultra-precision positioning apparatus, when configured for the example use, suffer an additional performance penalty due to overturning moments which tend to distort and disfigure a positioning apparatus during operation. An overturning moment is well known and generally defined as a torque which tends to rotate a body out of a reference plane.

In response to the concerns discussed above, what is needed is an ultra-precision positioning assembly that overcomes the problems of the prior art.

SUMMARY OF THE INVENTION

The present invention is an ultra-precision positioning assembly. Within the apparatus of the present invention, a slide base provides a foundational support. A slide plate moves with respect to the slide base along a first geometric axis. A ball-screw displaces the slide plate with respect to the slide base along the first geometric axis. A linking device directs a primary force vector into a center-line of the ball-screw. The linking device consists of a first link which directs a first portion of the primary force vector to an apex point, located along the center-line of the ball-screw, and a second link for directing a second portion of the primary force vector to the apex point. A set of rails, oriented substantially parallel to the center-line of the ball-screw, direct movement of the slide plate with respect to the slide base and are positioned such that the apex point falls within a geometric plane formed by the rails and the center-line of the ball-screw.

In other aspects of the invention, slide bearings, connecting the slide plate to the rails, constrain a portion of the primary force vector which tends to move the apex point away from the center-line of the ball-screw. A stepper motor rotates the ball-screw to displace the slide plate with respect to the slide base. A piezoelectric actuator alternatively pushes on the ball-screw to displace the slide plate with respect to the slide base.

In another embodiment of the invention, the slide base, the slide plate, the ball-screw, the linking device, rails, slide bearings, stepper motor, and piezoelectric actuator, together form a slide assembly, and multiple slide assemblies are distributed about a platform. In such a configuration, the platform may be raised and lowered, or tipped and tilted by jointly or independently displacing the slide plates.

The positioning assembly of the present invention is particularly advantageous over the prior art because in one embodiment, a 75 kg workpiece having a 470 mm×560 mm footprint can be positioned in a vertical work zone of 100 mm with a resolution of 50 nm, and tipped and tilted through angles up to plus or minus 0.25 degrees with a resolution of 0.5 microradian. The positioning assembly is also capable of achieving a low overall apparatus compliance of 40 nm/N (8 microinch/lb), and a structural first natural frequency above 100 Hz. A low overall compliance is analogous to a high degree of mechanical stiffness.

These and other aspects of the invention will be recognized by those skilled in the art upon review of the detailed description, drawings, and claims set forth below.

DETAILED DESCRIPTION OF THE PREFERRED EMBODIMENT

Figure 1:
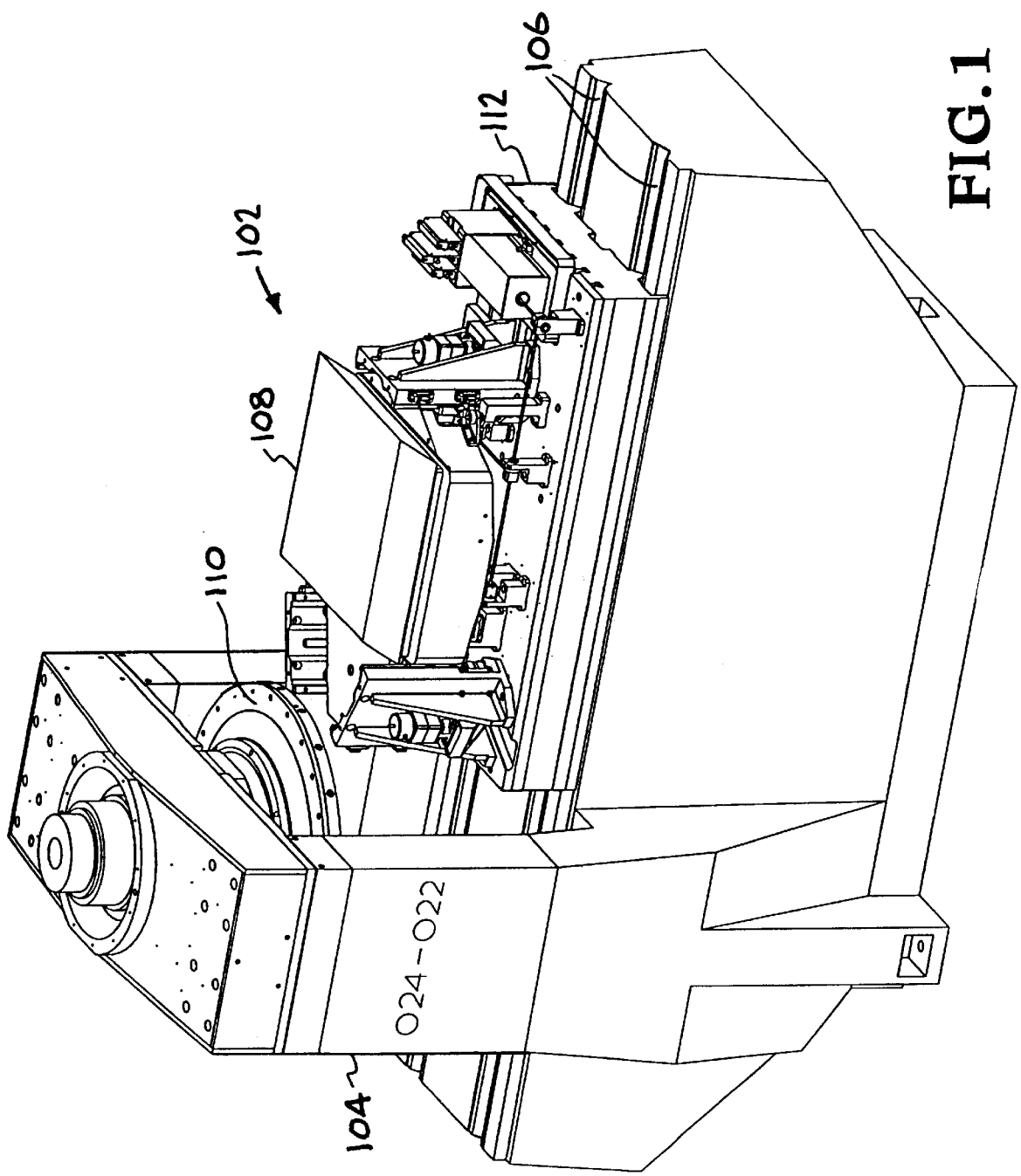
FIG. 1 is a pictorial diagram of a positioning assembly integrated into a diamond flycutting machine.

FIG. 1 is a pictorial diagram of a positioning assembly 102 integrated into a diamond flycutting machine 104. The positioning assembly 102 attaches to a horizontal slide 112 that travels along horizontal slideways 106 so that a workpiece 108 resting on the positioning assembly 102 can be passed under a flycutting head 110 of the machine 104. The positioning assembly 102 contains internal structures which vertically position the workpiece 108 with respect to the flycutting head 110. Those skilled in the art will recognize that the positioning assembly 102 is scalable and, in alternate embodiments, applicable to a variety of ultra-precision machining (single-point, fixed-abrasive, and loose abrasive), ultra-precision positioning (measurement and inspection devices, optical and laser devices, and astronomy), optics manufacturing and testing (glass, ceramic, and metal), and micro-fabrication (large-scale 3-D device) uses.

Figure 2:
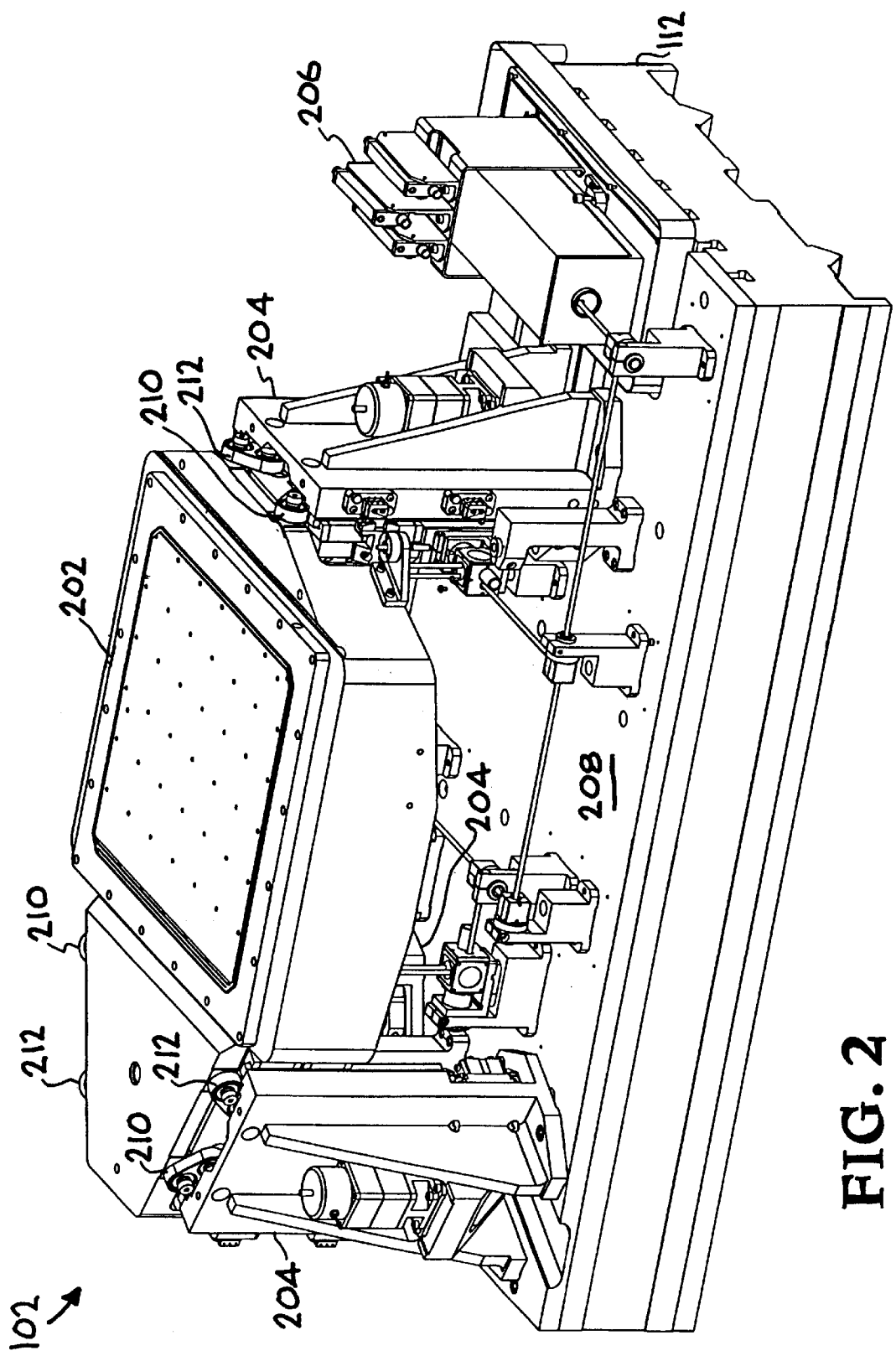
FIG. 2 is a pictorial diagram of the positioning assembly.

FIG. 2 is a pictorial diagram of the positioning assembly 102. The positioning assembly 102 consists of a horizontal platform 202 for holding the workpiece 108, three vertical-axis slide assemblies 204, a metrology system 206, and a positioning assembly base 208. The base 208 is positioned on horizontal slide 112 of the flycutting machine 104 so as to travel horizontally along the slideways 106. The three slide assemblies 204 are connected to the base 208 and arranged so that three hypothetical planes, perpendicular to a plane defined by the base 208 and perpendicular to a plane defined by each of the slide assemblies 204, intersect along a line (not shown). The platform 202 is supported and positioned by the three slide assemblies 204. Each of the slide assemblies are connected to the platform 202 with two links 210 and 212. Each link 210, 212 can transmit forces only along a link axis. The arrangement and coordination of the three slide assemblies 204 and six links 210 and 212 work to exactly constrain the platform 202, enabling ultra-precision positioning operations. The three slide assemblies 204 support and position the platform 202 with a high degree of mechanical stiffness, thus minimizing distortions. The platform 202 is raised and lowered, and tipped and tilted with respect to the base 208 using the slide assemblies 204.

Figure 3:
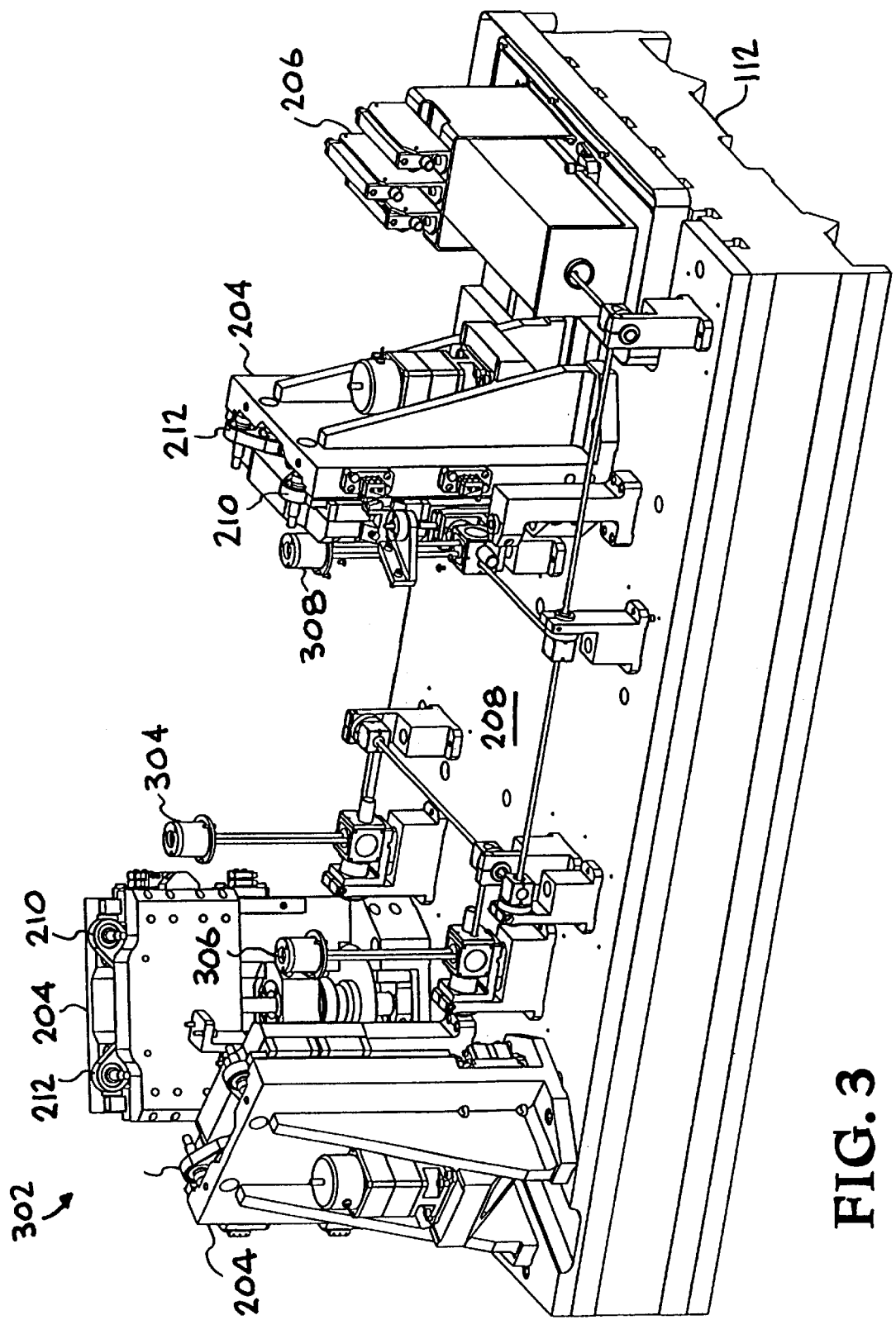
FIG. 3 is a pictorial diagram of a the positioning assembly with the platform removed.

FIG. 3 is a pictorial diagram 302 of the positioning assembly 102 with the platform 202 removed. With the platform 202 removed, the metrology system 206, consisting of three laser linear interferometers 304, 306, and 308, is more clearly viewable. The interferometers 304, 306, and 308 are used to measure the vertical position and tip and tilt orientation of the platform 202.

Figure 4A:
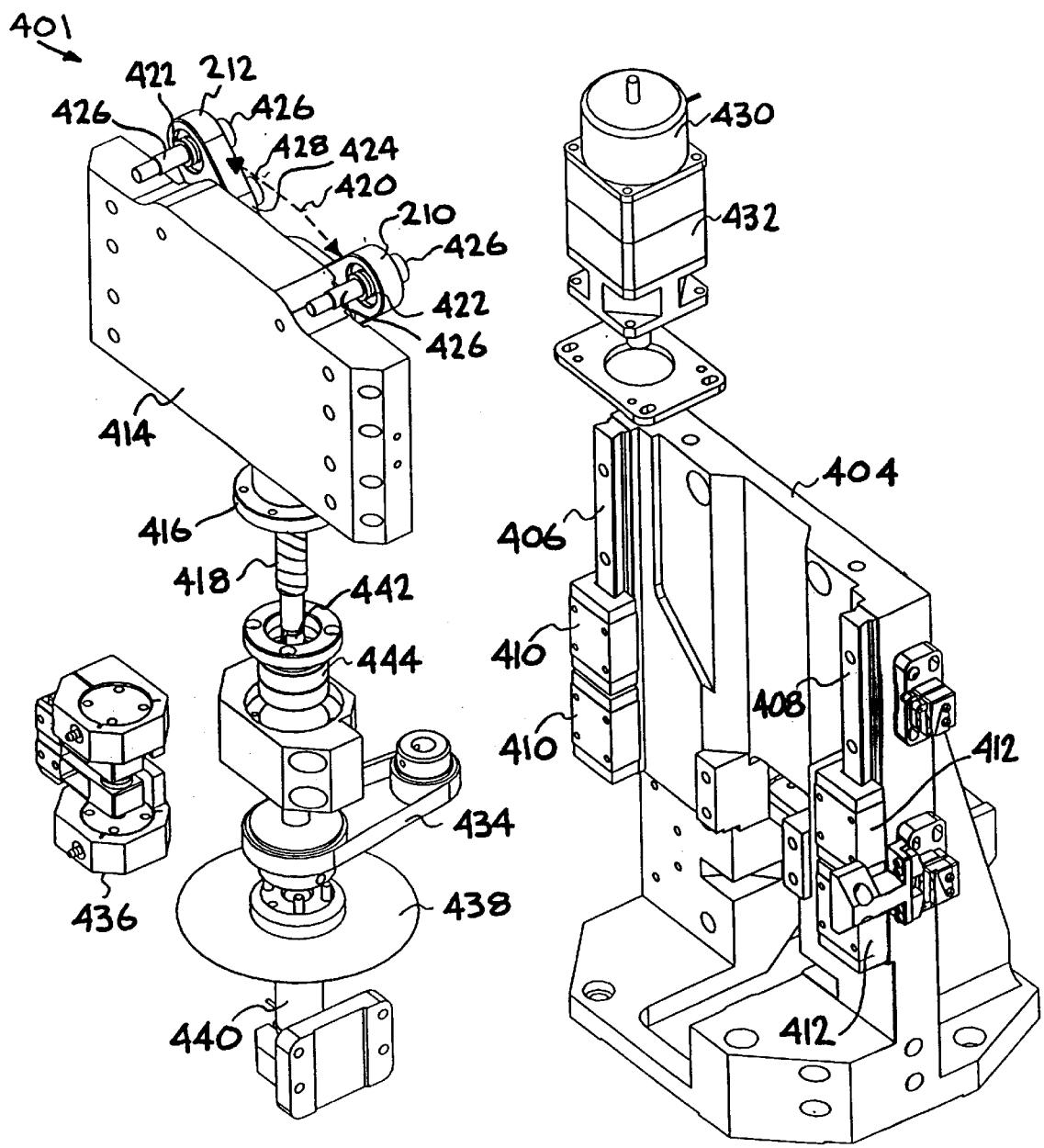
FIG. 4A is a first exploded view of one of a set of three slide assemblies.
Figure 4B:
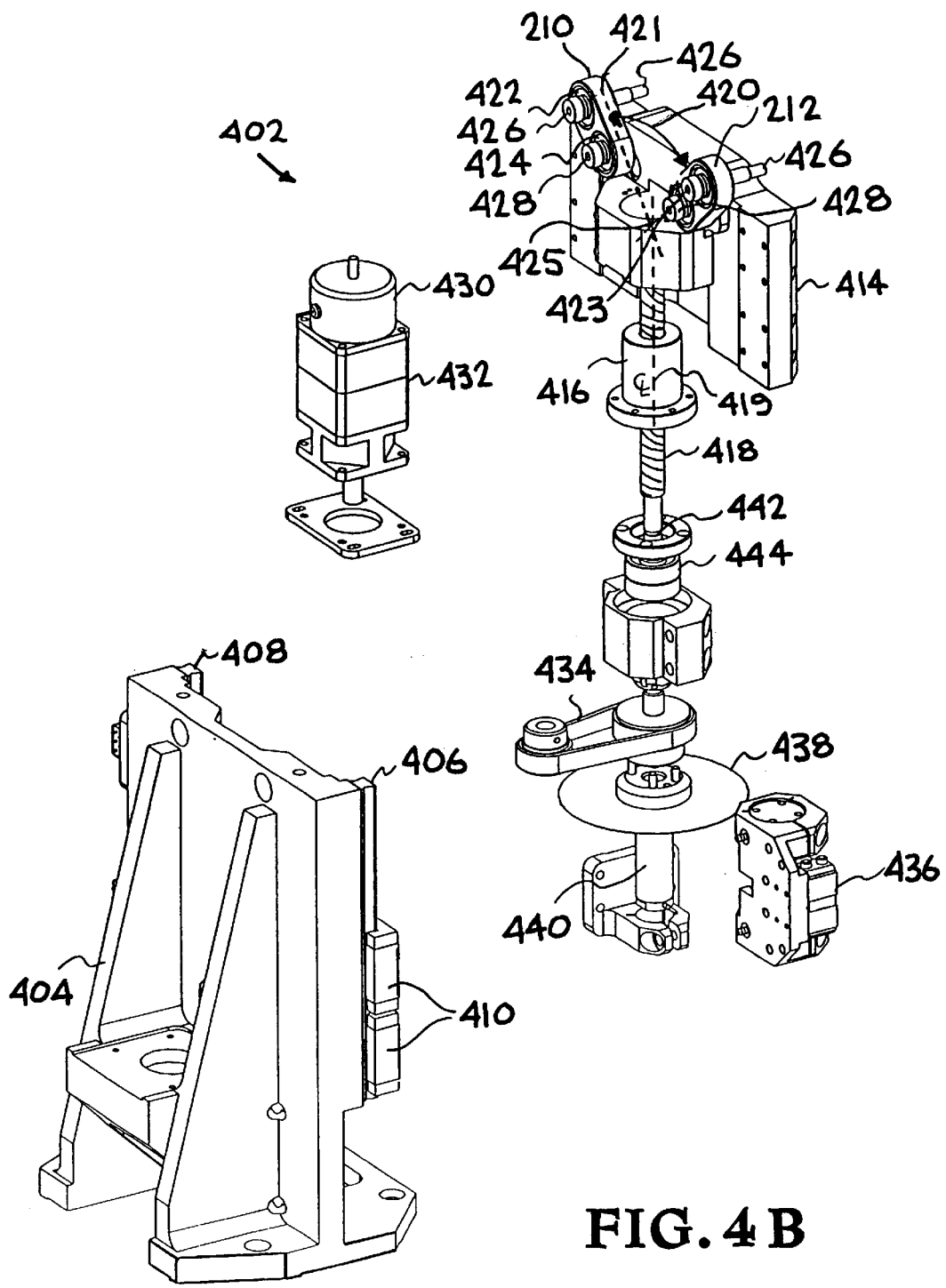
FIG. 4B is a second exploded view of one of the slide assemblies.
Figure 4C:
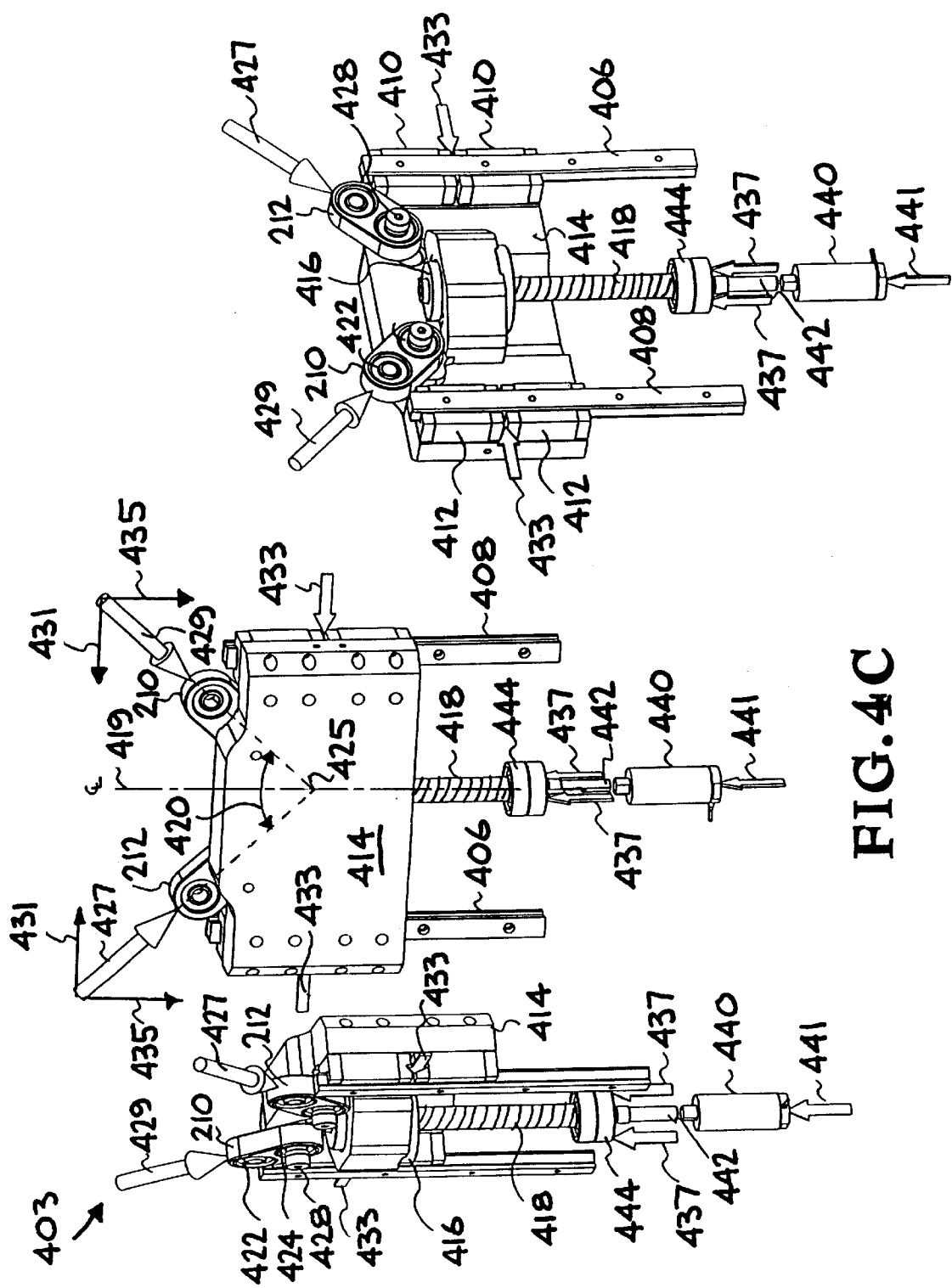
FIG. 4C is a pictorial diagram of force-carrying components on the set of three slide assemblies.

FIG. 4A is a first exploded view 401 of one of the slide assemblies 204. FIG. 4B is a second exploded view 402 of the slide assembly 204. FIG. 4C is a pictorial diagram 403 of force-carrying components on the set of three slide assemblies 204. Construction of only one of the slide assemblies 204 is now discussed, however, each of the slide assemblies 204 are preferably constructed using similar, although in some cases symmetrical, components. The slide assembly 204 is built starting with a slide base 404. The slide base 404 connects the slide assembly 204 to the positioning assembly base 208. A first and second rail 406 and 408 are attached to the slide base 404. The rails 406, 408 are positioned substantially parallel to each other and substantially perpendicular to a horizontal plane of movement of the positioning assembly 102, as defined by the horizontal slideways 106.

A first set of two recirculating-ball linear bearings 410 are mounted to rail 406 and a second set of two recirculating-ball linear bearings 412 are mounted to rail 408. When fully assembled, a slide plate 414 is fixed to the bearings 410, 412. The bearings 410, 412 permit translation of the slide plate 414 in a direction substantially perpendicular to the horizontal plane of movement of the positioning assembly 102, while substantially constraining translations and rotations within the horizontal plane of movement of the positioning assembly 102. The bearings 410, 412 also constrain rotations within planes perpendicular to the horizontal plane of movement of the positioning assembly 102.

A ball-nut 416 supported on a vertical-axis ball-screw 418 is mounted to the slide plate 414 such that a centerline 419 of the ball-nut 416 and ball-screw 418 assembly falls along a line midway between the bearing 410, 412 and rail 406, 408 assembly. The ball-screw 418 and ball-nut 416 together preferably form a recirculating ball-bearing with a helical raceway. Rotation of the ball-screw 418 with respect to the ball-nut 416 effects translation of the slide plate 414 along the rails 406 and 408. The centerline 419 of the ball-nut 416 and the ball-screw 418, along with centerlines of the linear bearings 410, 412, all fall within a geometric plane defined by centerlines of the rails 406 and 408.

The slide 414 is attached to the horizontal platform 202 by the links 210 and 212. The links 210, 212 are oriented to form an angle 420 that preferably opens away from the slide base 404. The angle 420 is preferably 90 degrees, however, those skilled in the art will recognize that the angle 420 may be of varying size. A small angle 420 increases a vertical stiffness of the slide assembly 204, while a larger angle 420 increases an horizontal stiffness of the slide assembly 204.

Each link 210, 212 has a first end 422 and a second end 424. The first end 422 is attached to the platform 202 with coupling device 426. The second end 424 is attached to the slide plate 414 with a coupling device 428. In its preferred embodiment the first end 422 allows rotation of the link 210, 212 in all directions around a point in a center of the coupling device 426 and in a plane define by centerlines of the rails 406 and 408, while constraining all translations of the first end 422 at that same point. In a similar fashion, the second end 424 allows rotation of the link 210, 212 in all directions around a point in the center of the coupling device 428 and in the plane defined by the centerlines of the rails 406 and 408, while constraining all translations of the second end 424 at that same point. In its preferred embodiment, the first end 422 and second end 424 of the links 210 and 212 act as self-aligning bearings that permit self-alignment of the platform 202 with respect to the slide 414 as the platform is tipped and tilted.

A plane formed by a first centerline 421 of link 210 and a second centerline 423 of link 212 falls within the geometric plane defined by the centerlines of the rails 406, 408. An apex 425 formed by intersection of the centerlines 421, 423 falls along the centerline 419 of the ball-nut 416 and the ball-screw 418, which, in the preferred embodiment, also falls along the line midway between the bearing 410, 412 and rail 406, 408 assembly. While the apex 425 can fall anywhere along the centerline 419 of the ball-nut 416, preferably the apex 425 is coincident with a geometric center point of the ball-nut 416.

The apex 425 functions essentially as a virtual point into which a first 427 and second 429 portion of a primary force vector from the platform 202 are directed. Any horizontal component 431 of the primary force vector is equally opposed 433 by the pair of rails 406, 408. Any vertical component 435 of the primary force vector is equally opposed 437 by the ball-screw 418 through its supporting thrust bearing 444. Due to the location of the apex 425 within the geometric plane formed by the rails 406, 408 and the ball-screw 418, primary forces 427, 429 from the platform 202 do not generate significant overturning moments, which would tend to twist or rotate the slide 414 out of the geometric plane formed by the rails 406, 408. Also, due to the location of the apex 425 at the line midway between the bearing 410, 412 and rail 406, 408 assembly, primary forces 427, 429 from the platform 202 do not generate significant overturning moments which would tend to twist or rotate the slide 414 within the geometric plane formed by the rails 406, 408. An overturning moment is well known and generally defined as a torque which tends to rotate a body out of a reference plane. Tipping or tilting the platform 202 will generate secondary force vectors (not shown) tending to push the apex 425 out of the geometric plane formed by the rails 406, 408, however, the bearings 410, 412 and rails 406, 408 keep the apex 425 within the geometric plane formed by the rails 406, 408 to an acceptable tolerance.

Due to the absence of significant overturning moments, standard rolling-element hardware may be used to construct the present invention. The present invention allows each slide assembly 204 to constrain one virtual point on the platform 202 from translations in either vertical or horizontal directions. Thus, the three slide assemblies 204 and six links 210, 212 provide exactly six degrees of constraint to the platform 202.

Those skilled in the art will know that in alternate embodiments of the present invention, the apex 425 may be positioned either to a left or right of the line midway between the bearing 410, 412 and rail 406, 408 assembly should a resulting effect on platform 202 positioning accuracy still fall within a now looser set of tolerances. Those skilled in the art will also know that in alternate embodiments of the present invention, the apex 425 may be positioned either to left or right of the centerline 419 of the ball-nut 416 and the ball-screw 418 should a resulting effect on platform 202 positioning accuracy still fall within a looser set of tolerances.

Those skilled in the art will also recognize that the links 210, 212 and coupling devices 426, 428 may be replaced with a wide variety of other linking devices which direct platform 202 forces into the apex 425. For instance, the links 210, 212 in an alternate embodiment can be replaced with a large ball held against the platform 202 by an array of smaller balls in a spherical socket within the slide 414, to create a freely rotating ball and socket support. Each slide 414 would have two ball and socket supports oriented and functioning similar to the links, so as to provide the same self-alignment and six degrees of constraint mentioned above.

As introduced above, three laser linear interferometers 304, 306, 308 are used to measure orientation of the platform 202. A measurement beam for each interferometer is positioned proximate and parallel to the ball-screw 418 of the slide assembly 204. A mathematical algorithm operating on a computer (not shown) then determines the position and orientation of the platform 202 from the measurement information from the interferometers 304, 306, 308. The measurement information is used by the computer to generate a target position for each of the three slides 414 so as to achieve a target position and orientation for the platform 202.

The slides 414 are positioned using coarse and fine adjustments controlled by the computer. Course adjustment is provided by a stepper motor 430 that drives the ball-screw 418 through a gear 432 and pulley 434 reduction that positions the slide 414 to a predetermined coarse accuracy. The gear and pulley reduction can be a 105-to-1 ratio and the predetermined coarse accuracy can be plus or minus 0.001 mm. Using the coarse adjustment, the computer positions the slide 414 to a sub-target position approximately equal to the target position of the slide 414 minus the predetermined coarse accuracy. Once the sub-target position is reached, the computer disables the stepper motor 430 and applies brake calipers 436 to a disk brake 438 attached to the ball-screw 418 to stop movement of the slide 414.

Fine adjustment is provided by a piezoelectric actuator 440 that exerts an upward vertical force 441 on bottom end 442 of the ball-screw 418. The force 441 elastically deflects the ball-screw upwards relative to thrust bearing 444, which supports it, raising the slide 414 to the target position to a predetermined fine accuracy. A typical predetermined fine accuracy is plus or minus 50 nm. In addition to fine positioning, the piezoelectric actuator 440 provides a second, parallel structural support path between the workpiece 108 and the slide base 404, aiding in the support of any vertical component 435 of the primary force vector, and lowering the overall apparatus compliance.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

a linking device, coupled to the slide plate, for directing a primary force vector into the center-line of the ball-screw;

wherein the linking device comprises a first link, coupled to the slide plate at a first location for directing a first portion of the primary force vector to an apex point, located along the center-line of the ball-screw;

a second link, coupled to the slide plate at a second location for directing a second portion of the primary force vector to the apex point;

wherein each of the links include a link body having a first end and a second end;

a first self-aligning bearing coupled to the first end of the link body; and a second self-aligning bearing coupling the second end of the link body to the slide plate.

2. The apparatus of claim 1 further comprising:

a first rail, coupled to the slide base at a first rail location and oriented substantially parallel to the center-line of the ball-screw, for directing movement of the slide plate; and a second rail, coupled to the slide base at a second rail location and oriented substantially parallel to the center-line of the ball-screw, for directing movement of the slide plate, and such that the apex point falls within a geometric plane formed by the first and second rails.

3. The apparatus of claim 2 further comprising:

a first slide bearing, coupling the slide plate to the first rail, for constraining a portion of the primary force vector which tends to move the apex point away from the center-line of the ball-screw; and a second slide bearing, coupling the slide plate to the second rail, for constraining the portion of the primary force vector which tends to move the apex point away from the center-line of the ball-screw.

4. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

a linking device, coupled to the slide plate, for directing a primary force vector into the center-line of the ball-screw;

wherein the linking device comprises a first link, coupled to the slide plate at a first location for directing a first portion of the primary force vector to an apex point, located along the center-line of the ball-screw;

a second link, coupled to the slide plate at a second location for directing a second portion of the primary force vector to the apex point;

wherein each of the links include:
  a socket coupled to the slide plate; and
  a ball coupled to receive the primary force vector.

5. The apparatus of claim 4 further comprising:

a first rail, coupled to the slide base at a first rail location and oriented substantially parallel to the center-line of the ball-screw, for directing movement of the slide plate; and a second rail, coupled to the slide base at a second rail location and oriented substantially parallel to the center-line of the ball-screw, for directing movement of the slide plate, and such that the apex point falls within a geometric plane formed by the first and second rails.

6. The apparatus of claim 5 further comprising:

a first slide bearing, coupling the slide plate to the first rail, for constraining a portion of the primary force vector which tends to move the apex point away from the center-line of the ball-screw; and a second slide bearing, coupling the slide plate to the second rail, for constraining the portion of the primary force vector which tends to move the apex point away from the center-line of the ball-screw.

7. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

a linking device, coupled to the slide plate, for directing a primary force vector into the center-line of the ball-screw;

wherein the slide plate includes:
  a mid-line located half-way from a first and a second end of the slide plate and coincident with the center-line of the ball-screw.

8. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

a linking device, coupled to the slide plate, for directing a primary force vector into the center-line of the ball-screw;

wherein the slide base, the slide plate, the ball-screw, and the linking device together form a first slide assembly;

a positioning assembly base;

a platform;

wherein the first slide assembly, coupling the positioning assembly base to the platform at a first location;

a second slide assembly, coupling the positioning assembly base to the platform at a second location; and a third slide assembly, coupling the positioning assembly base to the platform at a third location.

9. The apparatus of claim 8 wherein each said linking device couples one of the slide assemblies to the platform.

10. The apparatus of claim 8 wherein each said slide assembly is positioned substantially one hundred and twenty degrees with respect to each other said slide assembly.

11. The apparatus of claim 8 wherein the slide assemblies independently displace the platform at the locations to tip and tilt the platform.

12. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

a stepper motor, coupled to the ball-screw, for enabling the ball-screw to displace the slide plate with respect to the slide base;

a linking device, coupled to the slide plate, for directing a primary force vector into the center-line of the ball-screw;

wherein the linking device comprises a first link, coupled to the slide plate at a first location for directing a first portion of the primary force vector to an apex point, located along the center-line of the ball-screw;

a second link, coupled to the slide plate at a second location for directing a second portion of the primary force vector to the apex point;

wherein each of the links include a link body having a first end and a second end;

a first self-aligning bearing coupled to the first end of the link body; and a second self-aligning bearing coupling the second end of the link body to the slide plate.

13. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

a piezoelectric actuator, coupled to the ball-screw, for enabling the ball-screw to displace the slide plate with respect to the slide base;

a linking device, coupled to the slide plate, for directing a primary force vector into the center-line of the ball-screw;

wherein the linking device comprises a first link, coupled to the slide plate at a first location for directing a first portion of the primary force vector to an apex point, located along the center-line of the ball-screw;

a second link, coupled to the slide plate at a second location for directing a second portion of the primary force vector to the apex point;

wherein each of the links include a link body having a first end and a second end;

a first self-aligning bearing coupled to the first end of the link body; and a second self-aligning bearing coupling the second end of the link body to the slide plate.

14. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

an interferometer, coupled to measure displacement of the slide plate with respect to the slide base;

a linking device, coupled to the slide plate, for directing a primary force vector into the center-line of the ball-screw;

wherein the linking device comprises a first link, coupled to the slide plate at a first location for directing a first portion of the primary force vector to an apex point, located along the center-line of the ball-screw; and a second link, coupled to the slide plate at a second location for directing a second portion of the primary force vector to the apex point;

wherein each of the links include a link body having a first end and a second end;

a first self-aligning bearing coupled to the first end of the link body; and a second self-aligning bearing coupling the second end of the link body to the slide plate.

15. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

a stepper motor, coupled to the ball-screw, for enabling the ball-screw to displace the slide plate with respect to the slide base;

a linking device, coupled to the slide plate, for directing a primary force vector into the center-line of the ball-screw;

wherein the linking device comprises a first link, coupled to the slide plate at a first location for directing a first portion of the primary force vector to an apex point, located along the center-line of the ball-screw;

a second link, coupled to the slide plate at a second location for directing a second portion of the primary force vector to the apex point;

wherein each of the links include:
a socket coupled to the slide plate; and
a ball coupled to receive the primary force vector.

16. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

a piezoelectric actuator, coupled to the ball-screw, for enabling the ball-screw to displace the slide plate with respect to the slide base;

a linking device, coupled to the slide plate, for directing a primary force vector into the center-line of the ball-screw;

wherein the linking device comprises a first link, coupled to the slide plate at a first location for directing a first portion of the primary force vector to an apex point, located along the center-line of the ball-screw;

a second link, coupled to the slide plate at a second location for directing a second portion of the primary force vector to the apex point;

wherein each of the links include:
a socket coupled to the slide plate; and
a ball coupled to receive the primary force vector.

17. An apparatus for ultra-precision positioning, comprising:

a slide base;

a slide plate coupled to the slide base so as to allow movement of the slide plate along a first geometric axis;

a ball-screw, having a center-line, coupled between the slide base and the slide plate, for displacing the slide plate with respect to the slide base along the first geometric axis;

an interferometer, coupled to measure displacement of the slide plate with respect to the slide base;

a linking device, coupled to the slide plate, for directing a primary force vector into the center-line of the ball-screw;

wherein the linking device comprises a first link, coupled to the slide plate at a first location for directing a first portion of the primary force vector to an apex point, located along the center-line of the ball-screw;

a second link, coupled to the slide plate at a second location for directing a second portion of the primary force vector to the apex point;

wherein each of the links include:
a socket coupled to the slide plate; and
a ball coupled to receive the primary force vector.

* * * * *